United States Patent [19]
Gillyns et al.

[11] Patent Number: 5,817,403
[45] Date of Patent: Oct. 6, 1998

[54] NONWOVEN FABRIC

[75] Inventors: Emile M. Gillyns, Luxembourg; Victor L. E. Paquay, Wolkrange; Joseph A. Rausch, Luxembourg, all of Luxembourg

[73] Assignee: E. I. du Pont de Nemours and Company, Wilmington, Del.

[21] Appl. No.: 718,542

[22] PCT Filed: Apr. 12, 1995

[86] PCT No.: PCT/US95/04330

§ 371 Date: Oct. 9, 1996

§ 102(e) Date: Oct. 9, 1996

[87] PCT Pub. No.: WO95/28280

PCT Pub. Date: Oct. 26, 1995

[30] Foreign Application Priority Data

Apr. 13, 1994 [EP] European Pat. Off. ............... 94201011

[51] Int. Cl.$^6$ .............................. B32B 27/14; B32B 15/00
[52] U.S. Cl. .......................... 428/198; 442/403; 442/407; 442/415; 442/361
[58] Field of Search .................................. 442/361, 403, 442/404, 415; 428/198

[56] References Cited

PUBLICATIONS

W.H. Skoroszewski in "Plastics and Polymers", vol. 40 (147), pp. 142–152 (1972).

*Primary Examiner*—Helene L. Pezzuto

[57] ABSTRACT

A nonwoven fabric characterized in that it contains:
1) a fiber comprising a copolymer of propylene and ethylene; and
2) a fiber comprising a polypropylene homopolymer is disclosed.

19 Claims, No Drawings

NONWOVEN FABRIC

BACKGROUND OF THE INVENTION

The present invention relates to nonwoven fabrics which are made of randomly disposed, continuous synthetic fibers that are produced by a plurality of spinning beams delivered by multiple extruders and resulting in a web composed of multiple layers of the fiber that are laid on top of each other on a laydown belt, which is transported to bonding equipment where the layers are consolidated into a fabric.

Nonwoven fabrics have typically been made using one polymer component, e.g. polypropylene, polyester, to produce the matrix fiber of the nonwoven and a second polymer of a lower melting point, e.g. polyethylene, copolyester, to produce the binder fiber. Those two fibers can be extruded separately or extruded together such that the matrix fiber is the fiber core and the binder fiber is the sheath of the same fiber.

Alternatively, nonwoven fabrics have been made from a single polymer, a homopolypropylene fiber, which can be used for both the matrix and the binder. In this case, the fibers are alternatively mechanically drawn and undrawn generating on the same fiber the matrix and the binder. C.f. U.S. Pat. Nos. 3,341,394; 3,563,838; 3,821,062; 4,632,861; 4,634,739.

A disadvantage of several of the known nonwoven fabrics is that, where these fabrics consist of a plurality of layers of fibers, the layers do not adhere well to each of with adequate strength.

Thus, in certain rigorous end-uses, the fabric may become delaminated.

Moreover, prior art fabrics typically will not have desirable permeability characteristics, i.e. low porosity to air and/or liquids, which may be required for certain end-uses.

It has now been found that desirable improvements in the delamination strength and impermeability characteristics of nonwoven fabrics can be obtained by employing a fiber comprising a copolymer of propylene and ethylene in addition to a fiber comprising polypropylene.

SUMMARY OF THE INVENTION

Accordingly, the present invention is directed to a nonwoven fabric characterized in that it contains (1) a fiber comprising a copolymer of propylene and ethylene; and (2) a fiber comprising a polypropylene homopolymer. The fiber (1) will be overbonded versus fiber (2) because fiber (1) has a lower melting point resulting in less permeable structure.

According to the invention one or more layers of the fabric comprise a copolymer of propylene and ethylene, and optionally a blend of this copolymer with homopolypropylene. The blend of copolymer with homopolymer gives the possibility to spin lower denier fiber and thereby improve the total fiber distribution of the fabric using conventional spinning equipment. When the layers of fiber are consolidated into a fabric, the bonding temperature is selected according to the layers of the higher melt point polymer to obtain maximum strength fabrics, consequently the layers of copolymer or copolymer blend are overbonded and thereby partially or totally melted. Depending upon end use applications, at constant bonding conditions the level of overbonding of these layers and porosity of the surface can be selectively adjusted by the amount and type of copolymer in the melt blend. In addition the fiber can be easily mechanically drawn, thereby varying the fiber length and denier resulting in various levels of fiber distribution of various fiber melting points.

Such nonwoven fabrics will have a number of applications in conventional end uses such as carpet backings and geotextiles, and new end uses where lower air and/or water permeability is required such as in construction and packaging applications. Other applications envisioned will take advantage of lower melt point of the copolymer layer for better welding to itself or to other materials by ultrasonic bonding, hot welding or other similar techniques.

DETAILED DESCRIPTION OF THE INVENTION

As used herein, measurements and units are as follows, except where explicitly noted otherwise.

| Measurement | Unit | Reference |
|---|---|---|
| Melting point | °C. | Differential Scanning Calorimeter operated at a 10° C./min heating rate |
| Melt flow index | grams/10 min | ASTM D 1238 |
| Molecular weight distribution | — | Gel Permeation Chromatography |

Polypropylene homopolymers are known. While a wide variety may be used in the present invention and will selected according to the particularly properties needed for a particular end-use, preferred polypropylenes according to the invention will have one or more of the following characteristics: a melting point between 160° and 170° C.; a melt flow index of 3 to 40; a molecular weight distribution of 3 to 6; will be isotactic.

Copolymers of propylene and ethylene are known. While a wide variety may be used in the present invention and will selected according to the particular properties needed for a particular end-use, preferred copolymers will have one or more of the following characteristics: a melting point between 125° C. and 165° C.; a melt flow index of 1 to 20; a molecular weight distribution of 3 to 6; will contain up to 5% by weight ethylene.

Copolymers used in the present invention alone or in a blend with homopolypropylene polymer will have a lower melting point than previously used polypropylene polymer, and will melt at standard bonding conditions leading to reduced fabric pore size and permeability.

As mentioned above, fiber (1) may comprise a blend of a copolymer of propylene and ethylene and polypropylene homopolymer. In this case, the blend preferably comprises 1 to 99% by weight of the copolymer, more preferably 1% to 25% or 75 to 99% by weight copolymer.

Fibers are produced or "spun" from spinnerets according to procedures known in the art. The fiber is quenched and may thereafter be mechanically drawn prior to being laid down to form a web.

Mechanical drawing of a fiber refers to a known process in which the quenched, spun drawn fiber is reheated and stretched prior to laying it down to form a web. Mechanically drawn fibers have increased orientation and therefore a higher melting point than corresponding undrawn fibers. Where fibers are mechanically drawn in the present invention, they are drawn in ranges between 1 and 3.

The fibers used in the invention will typically have a denier ranging from 1 to 30 denier per filament (dpf). Fiber (1) according to the invention, i.e. the fiber comprising a copolymer of propylene and ethylene can be spun at lower deniers than polypropylene homopolymer fibers. Fiber (1) is spun preferably at a dpf in the range of 3 to 12, whereas fiber (2) is typically spun at a dpf in the range of 8 to 22. Accordingly, at equal weight basis, a fabric according to the invention will have a higher number of fibers than the prior art fabric, leading to improved cover and reduced pore size.

The nonwoven fabric of the present invention will be composed of a plurality of discrete layers. More specifically, the nonwoven fabric according to the present invention will be composed of two or more layers wherein at least one layer comprises fiber (1) and at least one layer comprises fiber (2). A particularly preferred structure is one being composed of three or more layers wherein one or both of the outer layers comprise fiber (1).

Optionally, the one or more layers of fiber (1) can be, after bonding, exposed to additional heat and pressure to melt them down to form a film. Drastic pore size reduction and reduced permeability can so be achieved where this is desired by the end use.

Nonwoven fabrics according to the invention can be made according to known procedures. Generally, the following procedure may be followed:

The present invention provides a bonded nonwoven sheet of continuous polyolefin filaments.

Several spinning beams consisting of adjacent spinning positions delivering 30 cm layer of filaments are supplied by two single screw extruders carrying the melted polymer at 240° C. to the spinnerets.

Each spinning beam delivers a layer of filaments which total width is proportional to the number of spinning positions in service.

Each position is equipped with a metering pump pushing the polymer through the spinnerets at desired rates (0.3 to 1.0 gr/hole/min). The fibers are quenched by cold air at a temperature around 15° C and drawn down. These fibers will be reheated on a set of rolls and mechanically drawn by another set of rolls driven at higher speed. Speed differential equals draw ratio. The first set of rolls are partially grooved and so parts of the fibers are not in contact with the heated surface. These fiber segments will not be drawn and will be the binder segments.

These fibers will be laiddown on a belt in either machine (MD), cross (XD) or random (R) direction pending desired properties balance. The accumulated layers will be thermally and mechanically bonded together to form a bonded fabric of a desired strength and porosity. The nonwoven fabric is surface bonded. The nonwoven fabric may also be pattern bonded.

Bonding times and temperatures will be selected according to the particular fibers used. If the bonding temperature approximately equals the melting point of the copolymer of fiber (1), there will be no need to use lower melting point binder fiber in the invention.

The fabric can be further calendered on or off line at variable conditions to further melt the layers of fiber (1), as may be required by a particular end use.

EXAMPLES

The following two examples demonstrate the reduction in air and water permeability which can be achieved by the invention.

As used herein, measurements of fabric properties are carried out according to the following test methods.

| Measurement | Unit | Reference |
| --- | --- | --- |
| Air permeability | 1/dm²/min | Textest FX 3030; DIN 53887 at 90 Pa pressure |
| Gurley porosity | sec | Gurley Densometer L and W; ISO 5636/5 |
| Hydrohead | cm H₂O | Shirley Hydrotester m³; ISO 811 |
| Bendtsen permeability | ml/min | L and W Autoline System; DIN 53120-1 |
| Moisture Vapor Transmission Rate (MVTR) | gr/m²/day | Schröder; DIN 53122 (1) |
| Pore size | μm | British Standard method B96906 Part 2: 1989 |
| Basis weight of fabric | gr/m² | |

Fabrics are produced using the following fibers:
Fiber (1): 75% by weight Nesté XB 60/50H (copolymer of propylene/ethylene - MFI 6.0; melt temp. 145° C.); 25% by weight polypropylene isotactic (MFI 4.2; melt temp. 164° C.) drawn at 1.8 ratio
Fiber (2) polypropylene isotactic (MFR 4.2; melt temp 164° C.) drawn at 1.85 and 2.3 ratio Fabrics are produced using the following fibers:

Fiber (1): 75% by weight Nesté XB 60/50 H (copolymer of propylene/ethylene—MFI 6.0; melt temp. 145° C.); 25% by weight polypropylene isotactic (MFI 4.2; melt temp. 164° C.) drawn at 1.8 ratio.

Fiber (2) polypropylene isotactic (MFR 4.2; melt temp 164° C.) drawn at 1.85 and 2.3 ratio.

Example 1

A three layer nonwoven fabric is made, whereby two layers are made from fiber (2) and the third layer is made from fiber (1). The layers are arranged such that a layer of fiber (2) and the layer of fiber (1) form the outside layers of the fabric and the other layer of fiber (2) forms the inside layer.

Each layer is produced using a plurality of spinnerets positioned across the width of the fabric. Each spinneret is fed with polymer material at a rate of 0.9 gr/hole in spinneret/min. Fiber (1) has a denier of 7 dpf and fiber (2) has a denier of 10 dpf.

Each layer has a weight of 35 gr/m², whereby the fabric has a basis weight of 105 gr/m². Air permeability is measured to be 144 1/dm2/min.

After calendering at 15 m/min, 197° C. and 250 N pressure in a one nip Kuesters calander unit, the air permeability of the fabric is reduced to the extent that it cannot be accurately measured with the Texttest method. Therefore, permeability is measured using other methods, as indicated below, which give the following results:

Gurley permeability: 7.5 sec

Bendtsen permeability: 3099 ml/min

Hydrohead: 20.2 cm H₂O

MVTR: 466 gr/m²/day

Comparison Example 1

For the purposes of comparison, a fabric is made according to the previous example, with the exception that all three layers are made from fiber (2) (homopolypropylene). Air permeability is measured to be 245 1/dm²/min. This fabric is not calendered.

Example 2

A four layer product is made generally following the procedure of Example 1, with the exception that two layers are made with fiber (2) produced at a rate of 0.9 gr/hole/min of spinneret and two 0.9 gr/hole/min of spinneret layers are made with fiber (1) produced at a rate of 0.68 gr/hole/min of spinneret.

The layers are positioned such that two fiber (1) layers are adjacent each other and the two fiber (2) layers are adjacent each other.

The fabric has a basis weight of 110 gr/m$^2$ (each fiber (2) layers has a weight of 31.2 gr/m$^2$; each fiber (1) layers has a weight of 23.7 gr/m$^2$. Fiber (1) has a denier of 7 dpf and a mechanical draw of 1.2. Fiber (2) has a denier of 10 dpf and a mechanical draw of 1.85 and 2.3 (first, respectively second layer). Air permeability is measured to be 115.0 1/dm2/min.

After calendering at 15 m/min, 197° C. and 250 N pressure in a one nip Kuesters calander unit, the air permeability of the fabric is reduced to the extent that it cannot be accurately measured with the Texttest method. Therefore, permeability is measured using other methods, as indicated below, which give the following results:

Gurley permeability: 10.8 sec

Bendtsen permeability: 2301.0 ml/min

Hydrohead: 20.5 cm H$_2$O

MVTR: 544 gr/m$^2$/day.

Comparison Example 2

For the purposes of comparison, a fabric is made according to the previous example, with the exception that all four layers are made from fiber (2) (homopolypropylene). Air permeability is measured to be 225 1/dm$^2$/min. This fabric is not calendered.

Examples 3 and 4

Fabrics are produced using the following fibers:

Fiber (1): 35% by weight Solvay KS 404 Grade (copolymer of propylene/ethylene—MFI 7.13; melt temp. 146° C.); 65% by weight polypropylene isotactic (MFI 4.2; melt temp. 164° C.) drawn at 1.8 ratio.

Fiber (2) polypropylene isotactic (MFR 4.2; melt temp 164° C.) drawn at 1.85 and 2.3 ratio.

Example 3

Pore Size Reduction

The reduced permeability of fabric according to this invention makes it suitable for use in applications where filtration of solid particles is required. Fabrics according to the invention will be able to prevent passage of certain size particles by the selective melting of fiber (1) layers to form layers that function as semipermeable films. Due to the special property of the fiber (1) layers, fabrics according to the invention can be made at a lower basis weight than traditional fabrics.

Fabrics containing four layers (two of fiber (1) adjacent each other and two of fiber (2) adjacent each other) have been produced at three basis weights. Each of the four layers has an identical basis weight, and is produced by a plurality of spinnerets, each operating at a polymer throughput of 0.9 gr/hole/min of spinneret. The fiber (1) has a denier of 6 dpf and fiber (2) has a denier of 10 dpf.

For the purposes of comparison, comparison fabric is made according to the same procedure as above with the exception that all layers are made of fiber (2) having a denier of 10 dpf.

| | Pore Size ($\mu$m) | | | |
|---|---|---|---|---|
| Basis Weight | Comparison Fabric | | Fabric According to the Invention | |
| | 0 90* | 0 95* | 0 90* | 0 95* |
| 100 gr/m$^2$ | 215 | 255 | 115 | 135 |
| 136 gr/m$^2$ | 110 | 125 | 55 | 75 |
| 155 gr/m$^2$ | 85 | 97 | 42 | 57 |

*= 90% or 95% of particles larger than the nominal $\mu$m will be retained by fabric or = 90/95% of the fabric pores are smaller than the nominal $\mu$m).

A further increase of the amount of copolymer in the blend will further reduce the permeability of the fabric.

Example 4

Lamination Strength of Fabric

This test demonstrates that using a fiber (1) type fiber in a nonwoven fabric not only enables reduction of the permeability of the fabric by melting partially or entirely this copolymer fiber, but additionally improves for certain applications the weld resistance of the fabric to itself or to other polyolefin-based articles. The test conducted as described below demonstrates that the delamination strength of two layers of fiber (1) welded together by conventional heat and pressure transfer equipment is superior to two layers of fiber (2) or one layer of fiber (1) and fiber (2) welded to each other.

Two samples of 10 cm width fabric of fiber (1) and/or fiber (2) are adhered together between two heated clamps and the delamination force is measured afterwards using an Instron device.

Temperature is adjusted as desired. Closing time of the clamps is set at 12 seconds and pressure is maintained at 2.4 kg/cm$^2$.

In order to avoid fiber sticking on the clamps, the two sheets are put between 2 sheets of polyamide (KAPTON, available from the DuPont Company).

The delamination force (maximum force) is measured on the 10 cm wide stripes with an Instron speed set at 50 mm/min.

| | Test results | | | |
|---|---|---|---|---|
| | Delamination force in kg: | | | |
| Fabric 1/Fabric 2 | 140° C. | 145° C. | 150° C. | 155° C. |
| a) Fiber 1/Fiber 1 | 0.40 | 2.0 | 15.6 | 24.7 |
| | 0.35 | 1.8 | 10.6 | 19.5 |
| | 0.70 | 1.4 | 15.0 | 23.5 |
| Avg: | 0.50 | 1.7 | 13.7 | 22.6 |
| b) Fiber 1/Fiber 2 | 0 | 0.5 | 7.90 | 20.3 |
| | 0 | 0.7 | 3.90 | 15.4 |
| | 0 | 0.8 | 4.10 | 21.3 |
| Avg: | 0 | 0.7 | 5.30 | 19.0 |
| c) Fiber 2/Fiber 2 | 0 | 0 | 3.00 | 11.1 |
| | 0 | 0 | 1.30 | 8.8 |
| | 0 | 0 | 2.10 | 9.1 |
| Avg: | 0 | 0 | 2.10 | 9.7 |

Nonwoven fabrics according to the invention may be coated with melts of various polymers e.g. polypropylene, polyethylene or blends thereof, or may be coated with other types of coating materials to increase the impermeability and other properties of the fabric.

We claim:

1. A nonwoven fabric comprising:
   (1) a fiber comprising a copolymer of propylene and ethylene; and
   (2) a fiber comprising a propylene homopolymer;
   wherein the fabric is surface bonded and when welded to itself has a delamination strength of at least 5 kg, as measured on a 10 cm wide sample strip with an Instron tester at a test speed of 50 mm/min.

2. A nonwoven fabric according to claim 1 wherein fiber (1) comprises a blend of a copolymer of propylene and ethylene and polypropylene homopolymer.

3. A nonwoven fabric according to claim 1 wherein the copolymer of propylene and ethylene contains up to 5% by weight ethylene.

4. A nonwoven fabric according to claim 2 wherein the blend comprises 1 to 99% by weight copolymer.

5. A nonwoven fabric according to claim 1 wherein the copolymer of fiber (1) has a melting point between 125° and 165° C. and the homopolymer of fiber (2) has a melting point between 160° and 170° C.

6. A nonwoven fabric according to claim 1 wherein the copolymer of fiber (1) has a melt flow index of 1 to 20 and a molecular weight distribution of 3 to 6.

7. A nonwoven fabric according to claim 1 wherein the homopolymer of fiber (2) has a melt flow index of 3 to 40 and a molecular weight distribution of 3 to 6.

8. A nonwoven fabric according to claim 1 wherein fiber (1) and fiber (2) are mechanically drawn.

9. A nonwoven fabric according to claim 1 wherein fiber (2) is mechanically drawn and fiber (1) is not mechanically drawn.

10. A nonwoven fabric according to claim 8 wherein the fiber (1) and (2) are drawn at a mechanical drawing ratio between 1 and 3.

11. A nonwoven fabric according to claim 1 being composed of two or more layers wherein at least one layer comprises fiber (1) and at least one layer comprises fiber (2).

12. A nonwoven fabric according to claim 11 being composed of three or more layers wherein the outer layers comprise fiber (1).

13. A nonwoven fabric according to claim 11 wherein one or more layers comprised of fiber (1) are melted to form a film by additional calendering methods.

14. A nonwoven fabric according to claim 9 wherein fiber (2) is drawn at a mechanical drawing ratio between 1 and 3.

15. A nonwoven fabric comprising:
    a fiber (1) that is a copolymer of propylene and ethylene, and a fiber (2) that is a polypropylene homopolymer;
    said nonwoven fabric having a first fiber layer and a second fiber layer;
    said first fiber layer consisting essentially of a blend of a fiber (1) and a fiber (2), said first layer comprised of 10% to 90% by weight of fiber (1) and of 10% to 90% by weight of fiber (2);
    said second fiber layer consisting essentially of said fiber (2);
    the fibers of said first and second fabric layer being surface bonded to achieve a delamination strength of at least 5 kg, as measured on a 10 cm wide sample strip with an Instron tester at a test speed of 50 mm/min.

16. A nonwoven fabric according to claim 15 wherein fiber (1) has a denier of between 3 and 10 dpf and fiber (2) has a denier of between 8 and 22 dpf.

17. A nonwoven fabric according to 16 wherein fiber (2) has a denier that is at least 2 dpf greater than the denier of fiber (1).

18. A nonwoven fabric according to claim 17 wherein said fabric is calendered and has a Gurley porosity, measured according to ISO 5636/5, of more than 5 seconds.

19. A nonwoven fabric according to claim 15 wherein said fabric is further comprised of a third fabric layer, said third fabric layer consisting essentially of a blend of a fiber (1) and a fiber (2), said third layer comprised of 10% to 90% by weight of fiber (1) and of 10% to 90% by weight of fiber (2).

* * * * *